Sept. 22, 1970    J. L. JEANNERET    3,529,499
ARRANGEMENT FOR TRANSFORMING LONGITUDINAL REFERENCE
ELEMENTS OBTAINED ON A LATHE INTO CORRESPONDING
TRANSVERSE ELEMENTS
Filed March 11, 1968
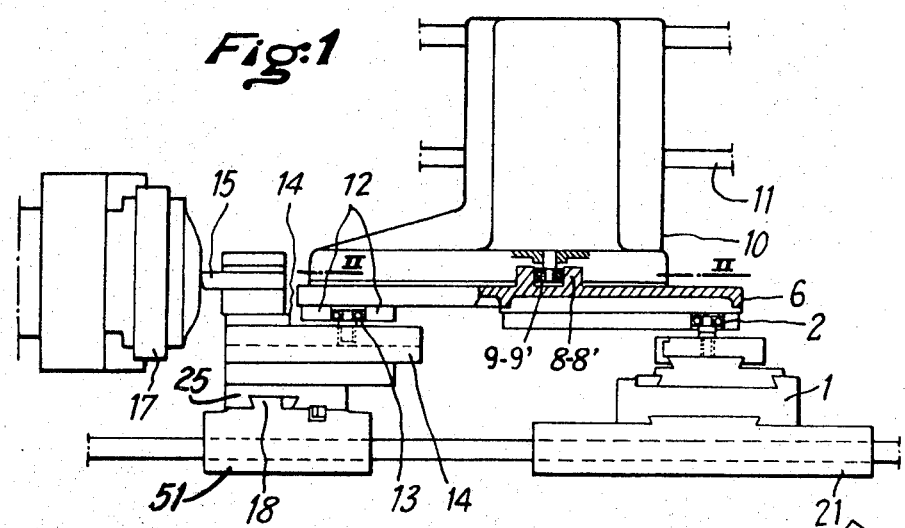
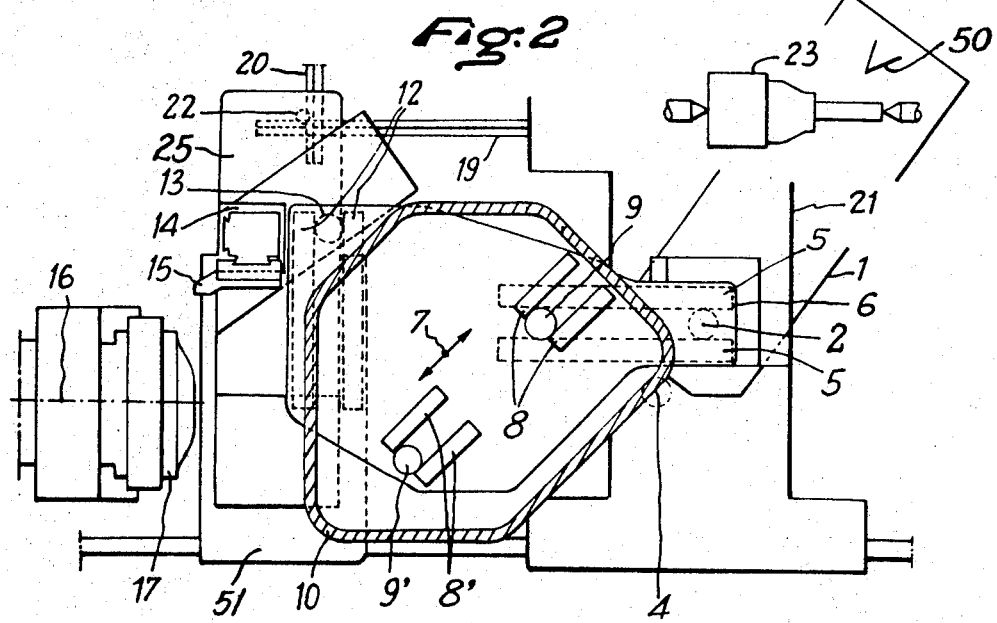
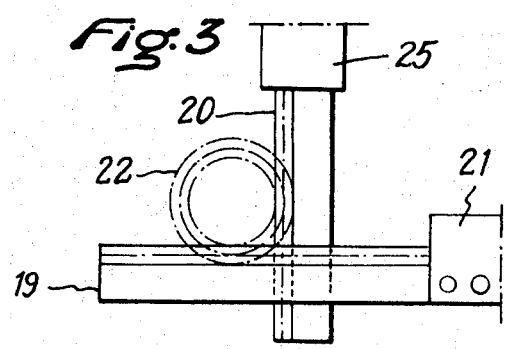
INVENTOR
JULES LOUIS JEANNERET
By Young & Thompson
ATTYS.

United States Patent Office
3,529,499
Patented Sept. 22, 1970

3,529,499
ARRANGEMENT FOR TRANSFORMING LONGI-
TUDINAL REFERENCE ELEMENTS OBTAINED
ON A LATHE INTO CORRESPONDING TRANS-
VERSE ELEMENTS
Jules Louis Jeanneret, 21 Rue Henry Gelin,
Niort, France
Filed Mar. 11, 1968, Ser. No. 712,047
Claims priority, application France, Mar. 17, 1967,
99,225
Int. Cl. B23b 3/28
U.S. Cl. 82—14                    2 Claims

ABSTRACT OF THE DISCLOSURE

An apparatus to be removably carried by a copying lathe so as to transmit the longitudinal components of the movements of the feeler engaging the template to be copied as longitudinal components for the blank-engaging copying tool along the blank axis lying at an angle, generally 90°, with reference to the template axis and to transmit the transverse components of the feeler as components of the tool transversely of the axis of the workpiece. This is obtained by means of a member sliding along an angle bisecting the workpiece and template axes and carrying slideways parallel with said axes and engaging rollers on the feeler and tool carriages so as to associate the longitudinal components of the two carriages. The transverse components are associated by longitudinally extending racks rigid with said carriages and engaging a common pinion.

---

My invention has for its object an auxiliary arrangement adapted to be removably secured to a copying lathe operating automatically in accordance with a predetermined cycle with a view to transferring the outline followed by a longitudinal reproducing tool onto an element lying transversely with reference to said outline.

To this end, I resort to a member adapted to slide along a line forming an angle of 45° with the orthogonal directions defining the longitudinal and transverse components of the copying movement, said sliding member carrying two slideways extending in parallelism with said orthogonal directions: the first slideway which is parallel with the direction of the longitudinal component of the copying movement is engaged by a roller carried by a first longitudinal copying carriage, while the second slideway which is parallel with the direction of transverse reproduction is engaged by a roller carried by the second carriage carrying also the transverse copying tool, whereby the movements of the first carriage in a direction perpendicular to the axis of the template to be copied are transmitted to the second carriage as movements in a direction perpendicular to the axis of the workpiece and conversely the movements of the first axis in a direction parallel with the axis of the template to be copied are transmitted to the second carriage through the agency of two orthogonal racks meshing with the same pinion.

I have illustrated in the accompanying drawings a preferred embodiment of my invention. In said drawings:

FIG. 1 is an elevational view of said embodiment.

FIG. 2 is a partly sectional plan view the section line of which is drawn at II—II in FIG. 1.

FIG. 3 illustrates with further detail the racks meshing with a common pinion.

The saddle 21 carries slidingly the copying carriage 1 rigid with the feeler 50 adapted to follow the outline of the template to be copied (FIG. 2).

The workpiece 17 engages on the other hand the cutting tool 15 carried by the transverse reproducing carriage 14. The problem to be solved is the transfer of the elements defined by the carriage 1 onto the carriage 14 which in turn is carried by a carriage 25 on a carriage 51, the movements of which carriage 14 should be perpendicular to those executed by the longitudinal copying carriage 1. In this connection, it will be noted that carriage 25 slides vertically relative to carriage 51 as seen in FIG. 2.

To this end, I resort to a member 6 sliding in the direction of the arrow 7, that is a direction forming an angle of 45° with the two copying directions. This is ensured by the primary slideways 8, 8' provided on the sliding member 6 and engaging the rollers 9, 9' carried by the stationary support 10 suspended from a crossmember 11 forming part of the frame of the apparatus.

The sliding member 6 is provided with secondary slideways 5 and 12 extending in parallelism each with one of the two copying directions, said slideways engaging respectively the roller 2 carried by the carriage 1 instead of the conventional copying tool and the roller 13 carried by the carriage 14. Assuming the roller 2 controlled by the feeler is shifted between its position 2 and a further position 4, the component of its displacement in a direction perpendicular to its slideway 5 constrains the sliding member 6 to move in the direction of the arrow 7 and consequently the roller 13 to move along the slideway 12. Thus, the carriage 14 and tool 15 are shifted in a direction perpendicular to the axis 16 of the workpiece 17 by an amount equal to the amount by which the carriage 1 is shifted in a direction perpendicular to the axis of the template 23.

As to the component of the copying movement of the carriage 1 in a direction parallel to the axis of the template, it has no action on the sliding member 6 and it is transmitted to the carriage 14 in a direction parallel to the axis of the workpiece through an arrangement including two racks 19 and 20 orthogonal with reference to each other and rigid respectively with the saddle 21 or with the carriage 1 and with the carriage 25. Both racks mesh with a common pinion 22 carried by the carriage 51, so that the longitudinal movements of the carriage 1 are transformed into equal transverse movements of the carriage 14 in a direction perpendicular to the direction of said longitudinal movements of the carriage 1.

The two components of the copying movements produce thus equal components in directions perpendicular to the original components so that the actual copying movements are also transformed into similar movements shifted through 90°.

Of course, numerous modifications may be brought to the arrangement described. Not only can the different elements by replaced by equivalent elements, but also the parts played by the racks and the sliding member may be interchanged and the angles through which the movements are shifted may also be modified by acting on the angle defined between the two racks, the primary slideway 8, 8' extending in all cases along a line bisecting the directions of the two slideways 5, 12 which are parallel with the two copying components. It is also possible to replace the slideway and/or the rack arrangement by equivalent means.

What I claim is:

1. Apparatus to be removably carried by a copying lathe including a first carriage carrying a feeler adapted to follow the outline of the template, said apparatus comprising a second carriage, a copying tool carried by the second carriage and adapted to form in a workpiece an outline copying that followed by the feeler, means for shifting said carriage along axes at an angle with reference to each other, a stationary support, a member adapted to slide with reference to said support along a line bisecting said axes, two slideways carried by said sliding member and parallel respectively with said axes, a roller rigid with each carriage and engaging the corresponding slideway to transform one component of the movement of the first carriage into a corresponding component of the movement of the second carriage, racks rigid with the first and second carriage and extending in similar angular relationship with the axes of the workpiece and template, and a common pinion meshing with both racks to transform the other component of the first carriage into a corresponding component of the second carriage.

2. Apparatus as claimed in claim 1 wherein the axes of the workpiece and template are orthogonal and the transverse components are perpendicular to the parallel components.

References Cited

UNITED STATES PATENTS 2,922,327  1/1960  Schoepe _____ 82—14
3,373,640  3/1968  Allen et al. _____ 82—14

GERALD A. DOST, Primary Examiner

U.S. Cl. X.R.

82—11